(12) United States Patent
Puetz et al.

(10) Patent No.: US 6,711,339 B2
(45) Date of Patent: Mar. 23, 2004

(54) FIBER MANAGEMENT MODULE WITH CABLE STORAGE

(75) Inventors: Curtis Lee Puetz, Apple Valley, MN (US); Timothy J. Haataja, Prior Lake, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 68 days.

(21) Appl. No.: 10/159,775

(22) Filed: May 31, 2002

(65) Prior Publication Data

US 2003/0223724 A1 Dec. 4, 2003

(51) Int. Cl.[7] ................................................ G02B 6/04
(52) U.S. Cl. ...................................................... 385/135
(58) Field of Search ................................ 385/134, 135, 385/136, 137

(56) References Cited

U.S. PATENT DOCUMENTS

| | | | | |
|---|---|---|---|---|
| 5,717,810 A | * | 2/1998 | Wheeler ...................... | 385/135 |
| 5,758,003 A | * | 5/1998 | Wheeler et al. ............. | 385/134 |
| RE37,489 E | * | 1/2002 | Anton et al. .................. | 385/53 |
| 6,418,262 B1 | * | 7/2002 | Puetz et al. .................. | 385/134 |
| 6,424,781 B1 | | 7/2002 | Puetz et al. .................. | 385/135 |
| 6,487,356 B1 | * | 11/2002 | Harrison et al. ............. | 385/135 |

FOREIGN PATENT DOCUMENTS

| | | |
|---|---|---|
| WO | WO 00/52504 | 9/2000 |
| WO | WO 00/75706 | 12/2000 |

OTHER PUBLICATIONS

Drawings of ADC Telecommunications for an OMX Pigtail Modules Assembly Drawing, 6 sheets, admitted as prior art as of May 31, 2002.
ADC Telecommunications brochure entitled "FL2000 Products," 48 pages and cover pages, dated 11/96.
ADC Telecommunications, Inc. catalog entitled "Fiber Panel Products, Second Edition," dated 7/96, 111 pages and cover pages.
ADC Telecommunications, Inc. catalog entitled "Secure Fiber Entrance Termianl (SFET)," dated 5/98, 8 pages.
ADC Telecommunications, Inc. catalog entitled "Fiber Cable Management Products, Third Edition," dated 6/98, 137 pages and cover pages.

* cited by examiner

Primary Examiner—Tulsidas Patel
(74) Attorney, Agent, or Firm—Merchant & Gould P.C.

(57) ABSTRACT

A fiber optic telecommunications bay is provided including modules each including a pivoting panel which selectively closes a portion of the module. Each module has first and second cable access locations. The first cable access location enters the module and allows termination of the cables at the pivoting panel. An opposite side of the pivoting panel allows cables to extend into a second area of the module for storage, and then exiting of the module at a second access location.

24 Claims, 15 Drawing Sheets

FIBER MANAGEMENT MODULE WITH CABLE STORAGE

BACKGROUND OF THE INVENTION

1. Field of the Invention

This invention pertains to the telecommunications industry. More particularly, this invention pertains to a high-density fiber termination bay or frame for use in the telecommunications industry.

2. Description of the Prior Art

In the telecommunications industry, use of fiber optic cables for carrying transmission signals is rapidly growing. To connect fiber optic equipment, fiber bays and frames have been developed. Examples of prior art fiber frames are shown in commonly assigned U.S. Pat. Nos. 4,995,688; 5,497,444; and 5,758,003. In each of the fiber frames of the prior patents, a plurality of adapters are provided which permit attachment of fiber optic connectors to both sides of each adapter in order to optically couple two fiber optic cables. Cables from the adapters are connected to various pieces of fiber optic equipment. Using patch cords or cables between the adapters, the pieces of optical equipment can be cross-connected or interconnected through the frames.

In some frames, ribbon cable with multiple fibers is broken out, or fanned out into individual fiber, or simplex cables. Management of the ribbon cables, and the simplex cables are also important.

Notwithstanding advances previously made in the art, there is a continuous need for further advances to maintain a high-density of connector terminals. There are further needs for ready access to the fiber optic connectors and couplers, enhanced fiber management, and avoidance of excessive bending and stresses on the fiber optic cables.

SUMMARY OF THE INVENTION

A breakout bay allows termination of cables at a panel including fiber optic terminations. Cable storage is provided for cables on a first side of the panel, and cable storage is provided for cables on a second side of the panel. Preferably, the panel faces a front of a module holding the panel. Preferably, the panel pivots to allow access to an opposite side of the panel.

DETAILED DESCRIPTION OF THE PREFERRED EMBODIMENT

Referring to FIGS. 1–5, one preferred embodiment of a frame or bay 20 is shown for terminating and managing fiber optic cables within the bay. Shown next to bay 20 is an equipment bay 22 for holding telecommunications equipment. Bay 20 can be used for fanning out or breaking out multi-fiber cables from equipment bay 22 in equipment area 24. Equipment 24a is shown schematically in FIG. 2.

Figure 1:
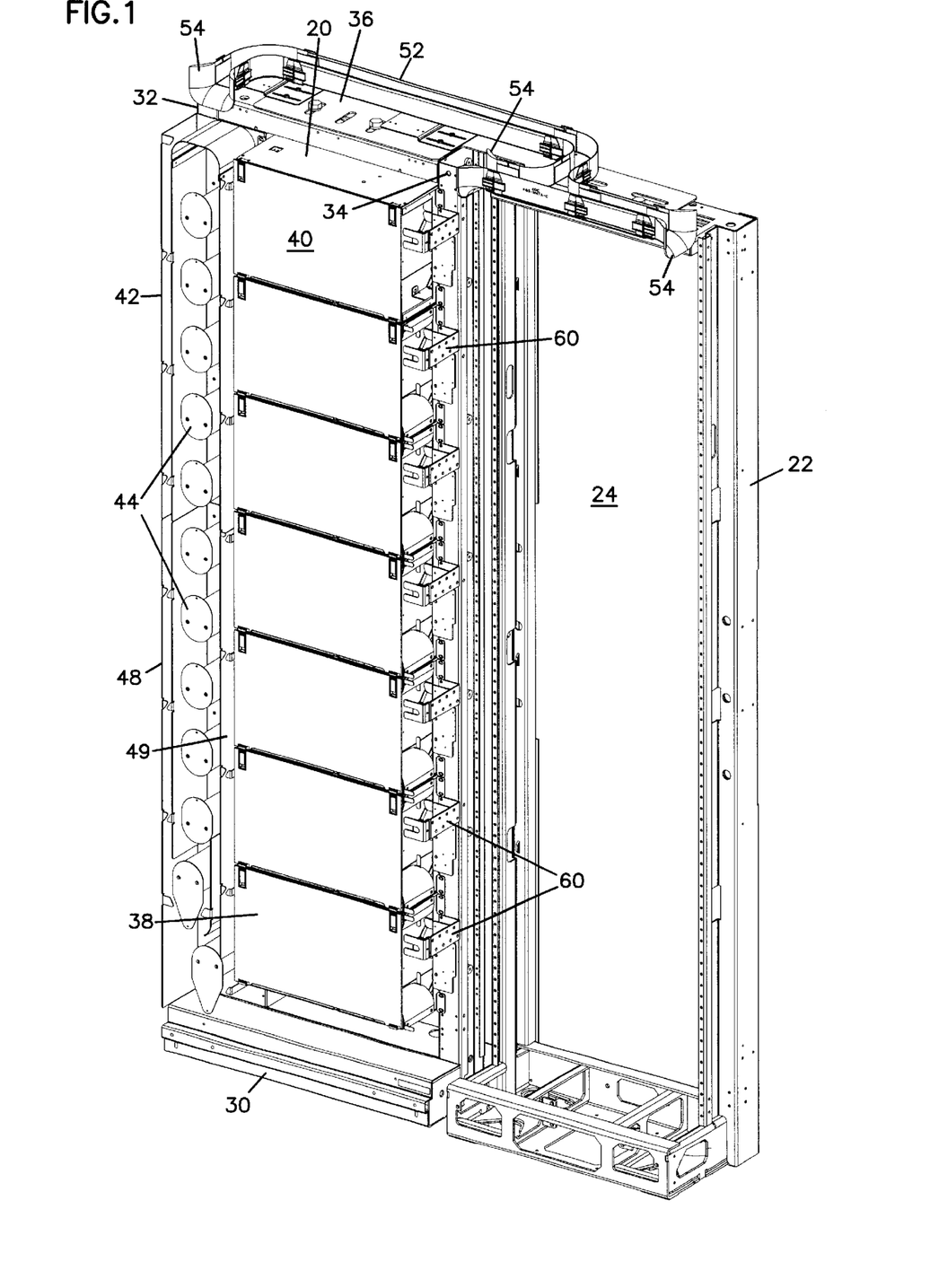
FIG. 1 is a front, top and right side perspective view of a first embodiment of a fiber breakout bay and an equipment bay according to the present invention.
Figure 2:
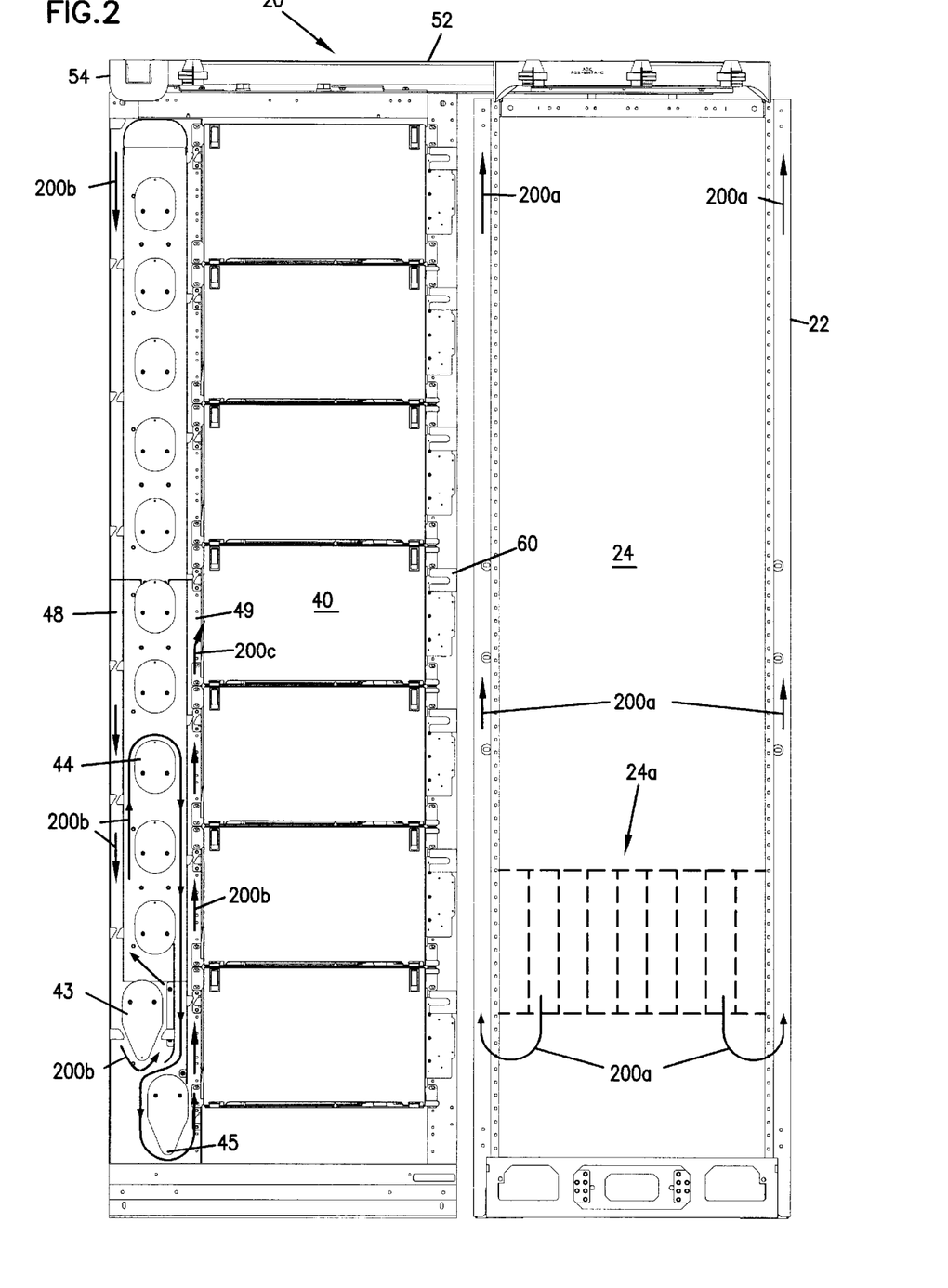
FIG. 2 is a front view of the bays of FIG. 1.
Figure 3:
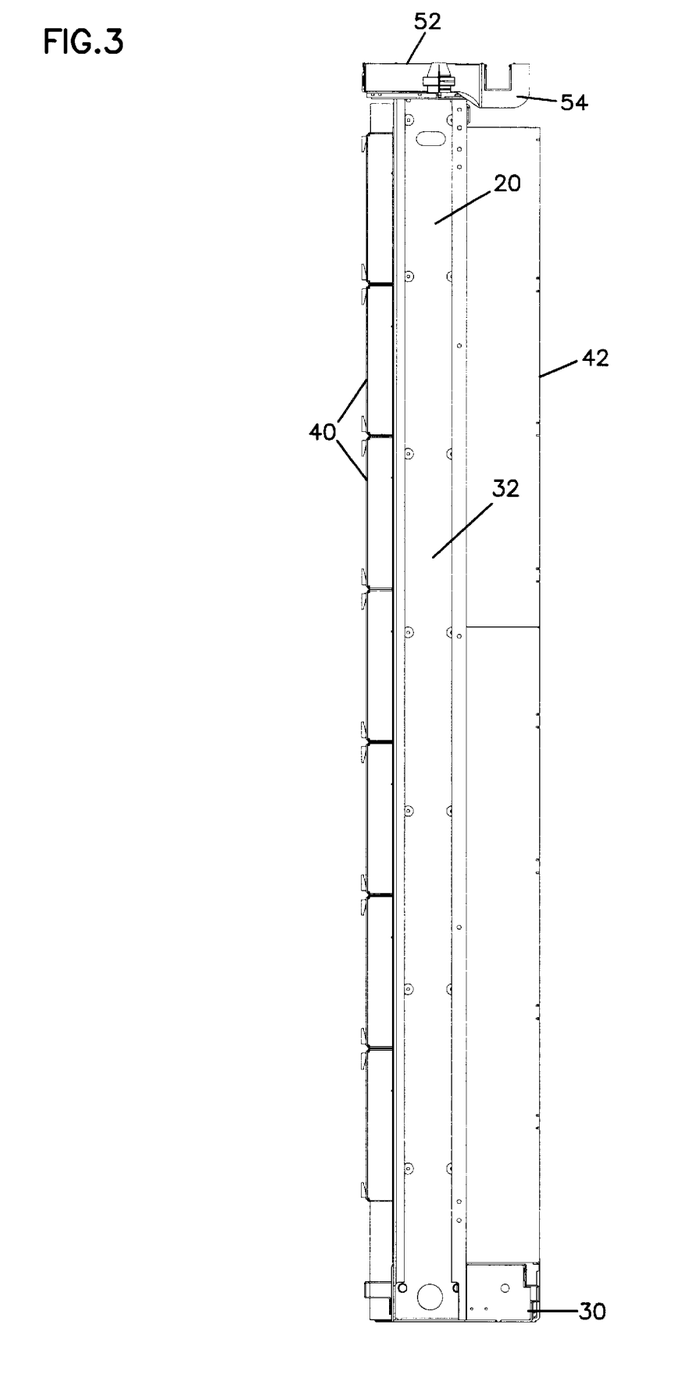
FIG. 3 is a left side view of the bays of FIG. 1.
Figure 4:
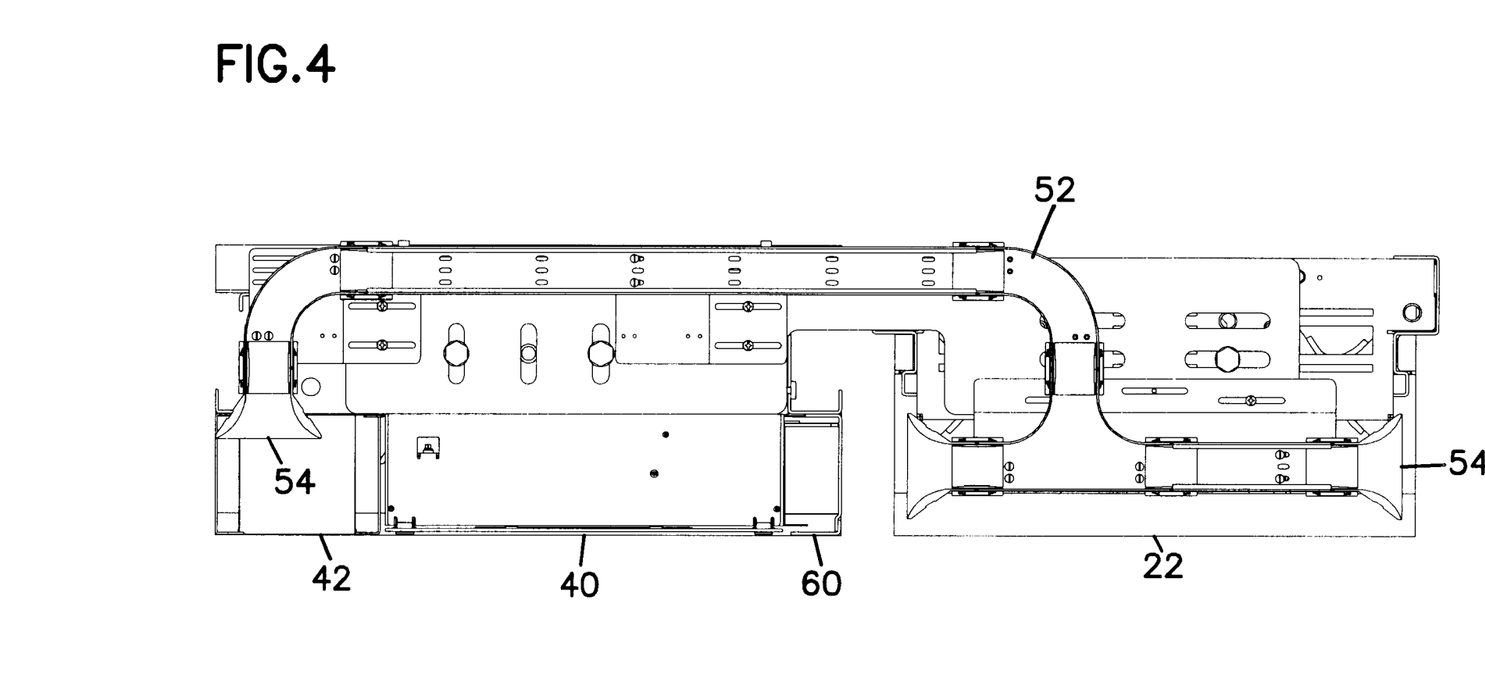
FIG. 4 is a top view of the bays of FIG. 1.
Figure 5:
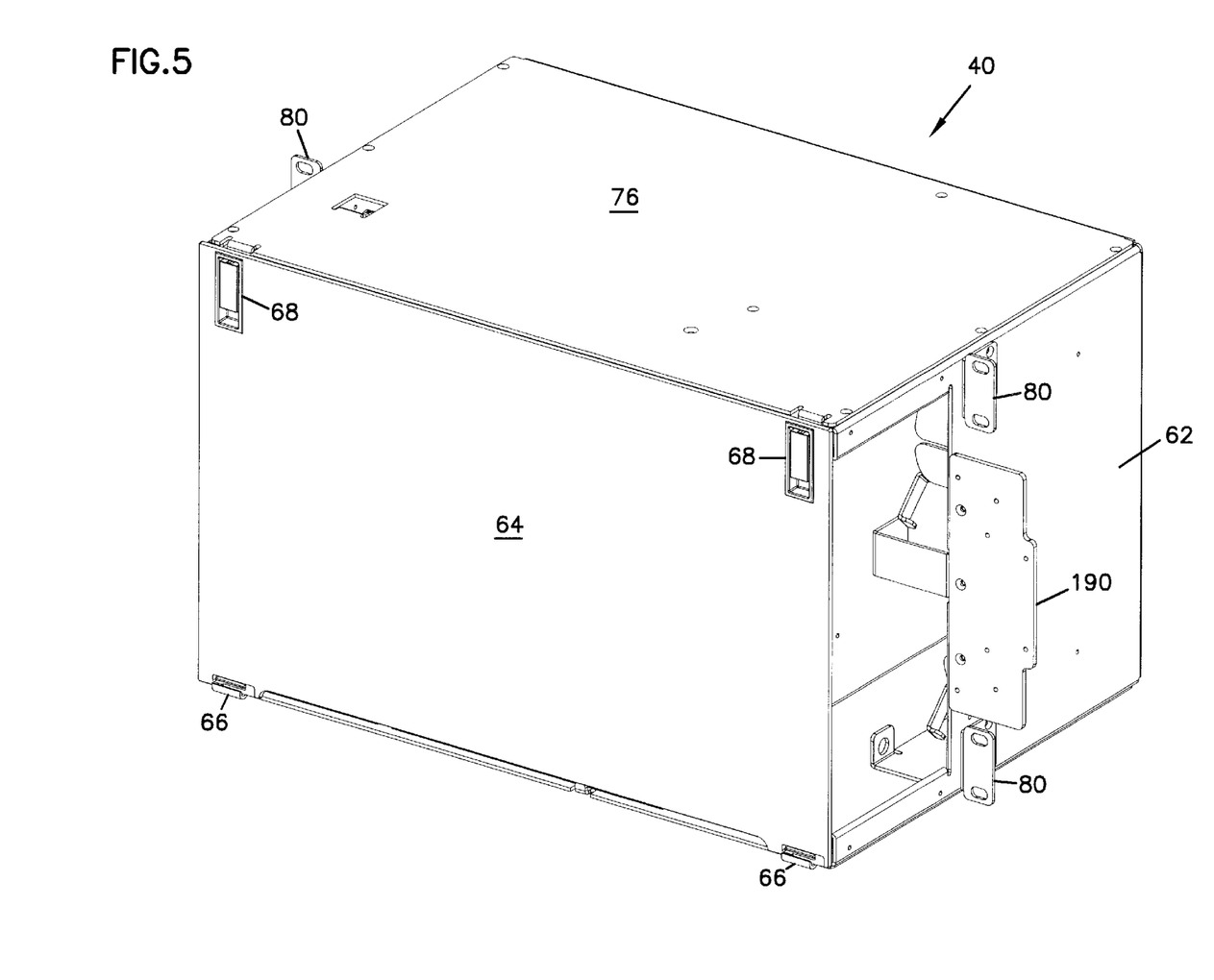
FIG. 5 is a front, top and right side perspective view of one of the termination modules in the breakout bay of FIG. 1.
Figure 6:
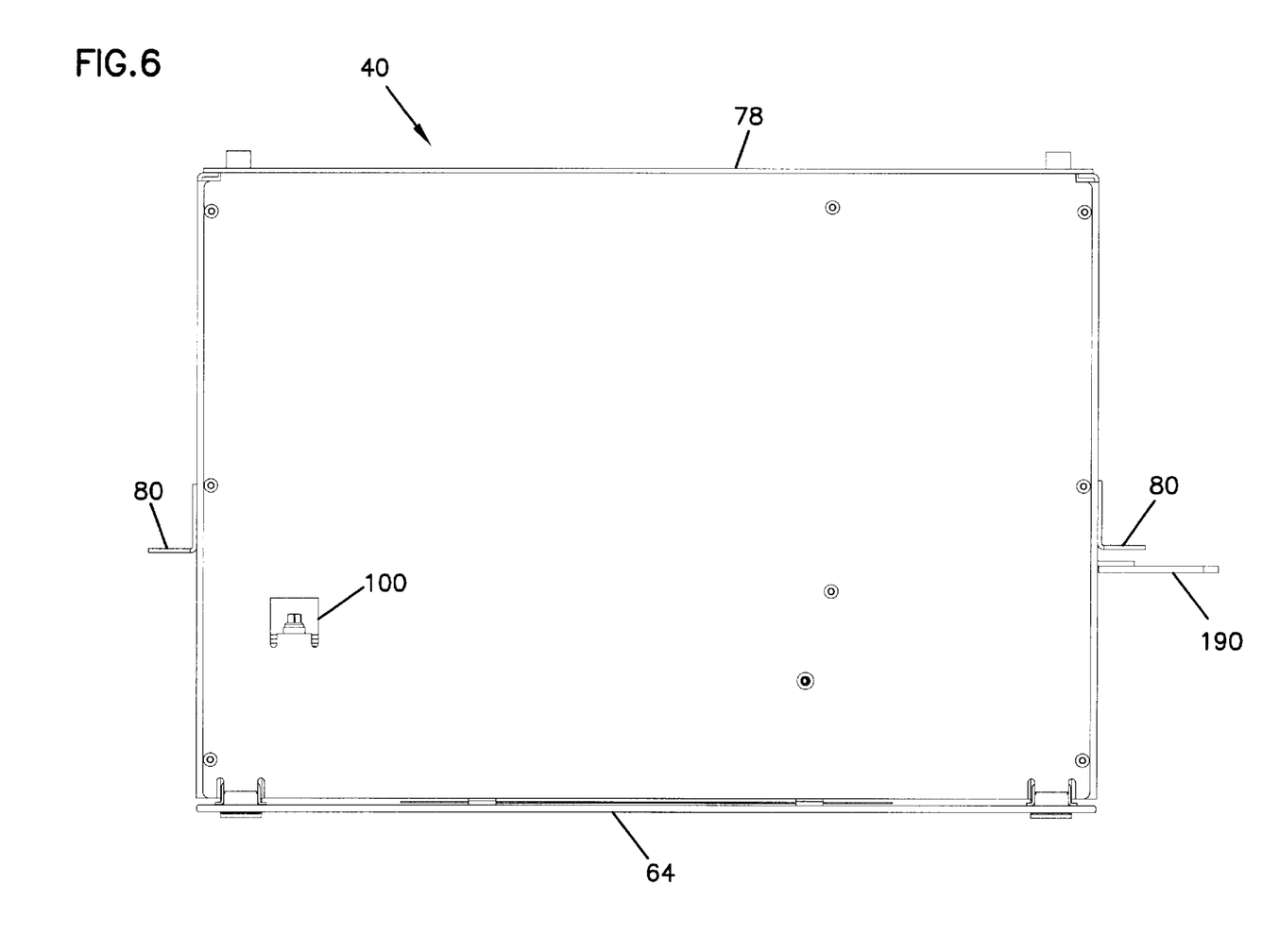
FIG. 6 is a top view of the termination module shown in FIG. 5.
Figure 7:
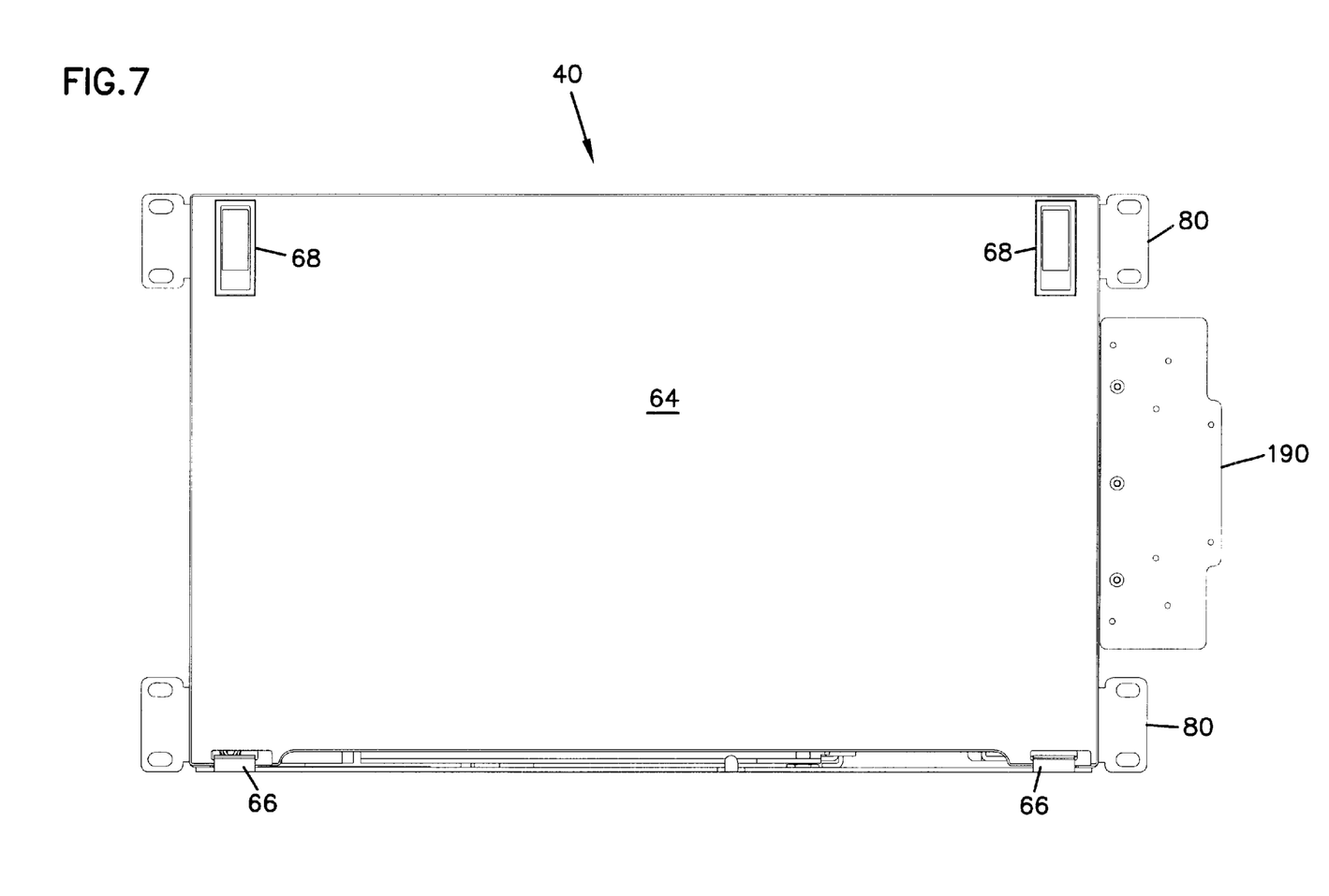
FIG. 7 is a front view of the termination module shown in FIG. 5.
Figure 8:
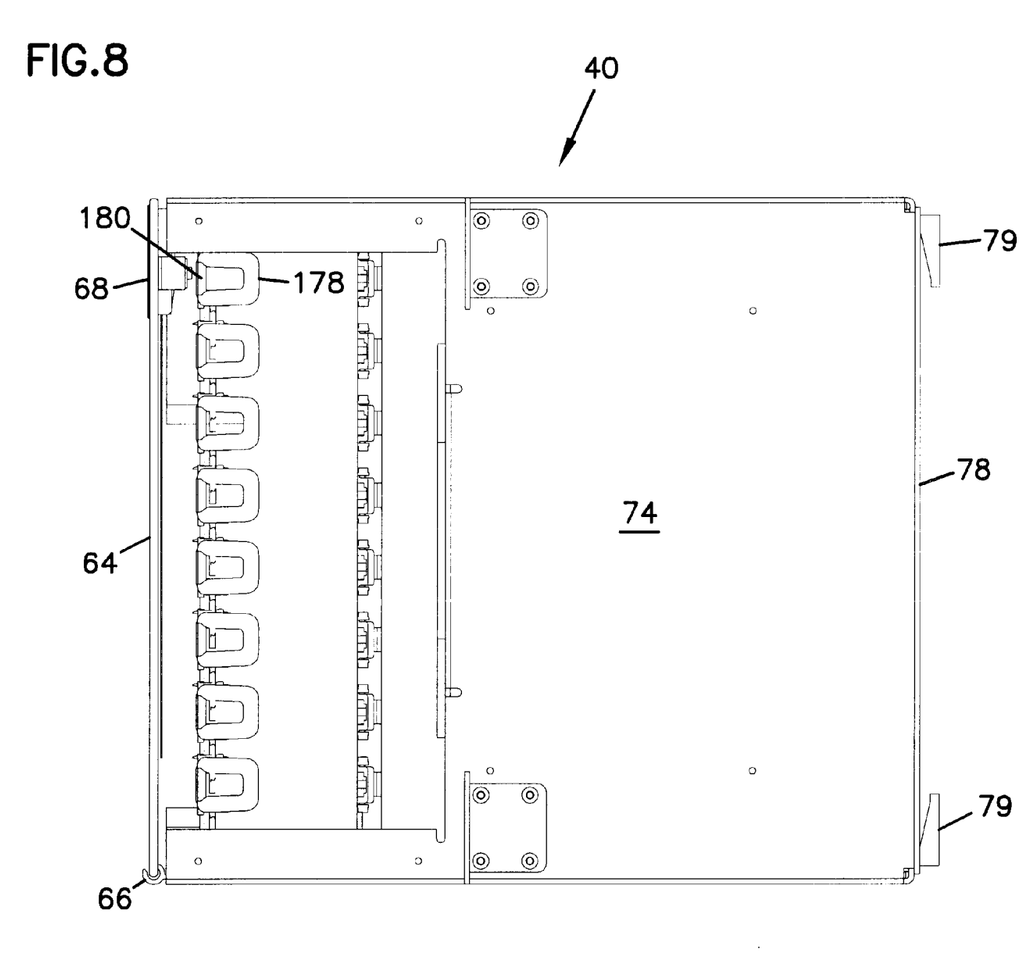
FIG. 8 is a right side view of the termination module shown in FIG. 5.
Figure 9:
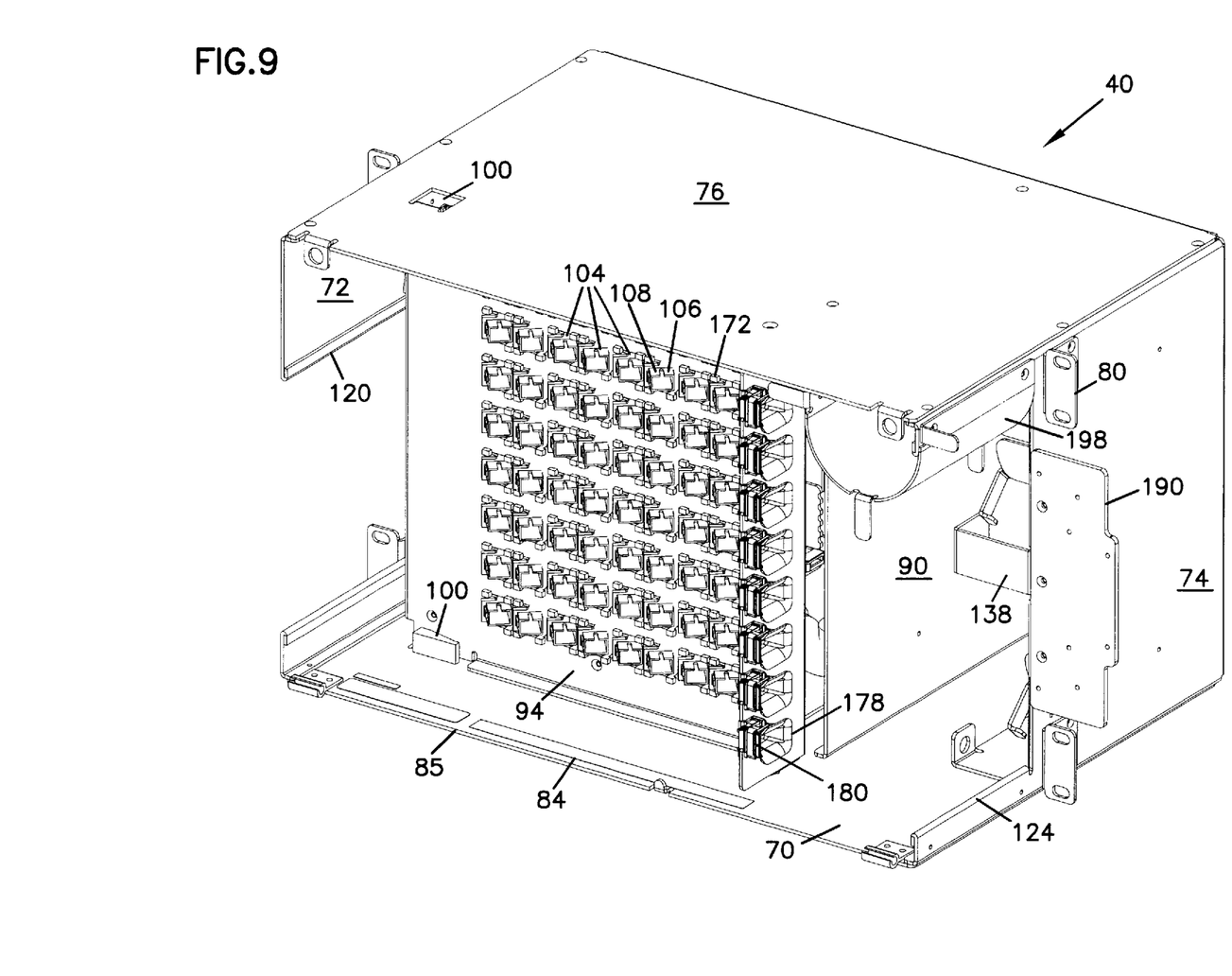
FIG. 9 is a front, top and right side perspective view of the termination module shown in FIG. 5, without the front cover and with a cable radius limiter mounted on the upper right.

Bay 20 includes a base 30, first and second sides 32, 34, and a top 36. Positioned in area 38 are a plurality of termination modules 40. Bay 20 also includes an inner bay management panel 42 for storing cables.

Inner bay management panel 42 includes a plurality of spools 44 and vertical cable guides 48, 49. Lower spools 43, 45 cooperate with one of spools 44 to store a slack loop 200b of cable (See FIG. 2).

Adjacent top 36 of bay 20 is cable troughing 52 for directing cables from above equipment rack 22 to above bay 20. Cable troughing 52 includes trumpet ends 54 for cable bend protection so as to prevent the cables from being bent below a minimum bend radius. Bay 20 further includes a vertical cable guide 60 adjacent to second side 34.

Figure 10:
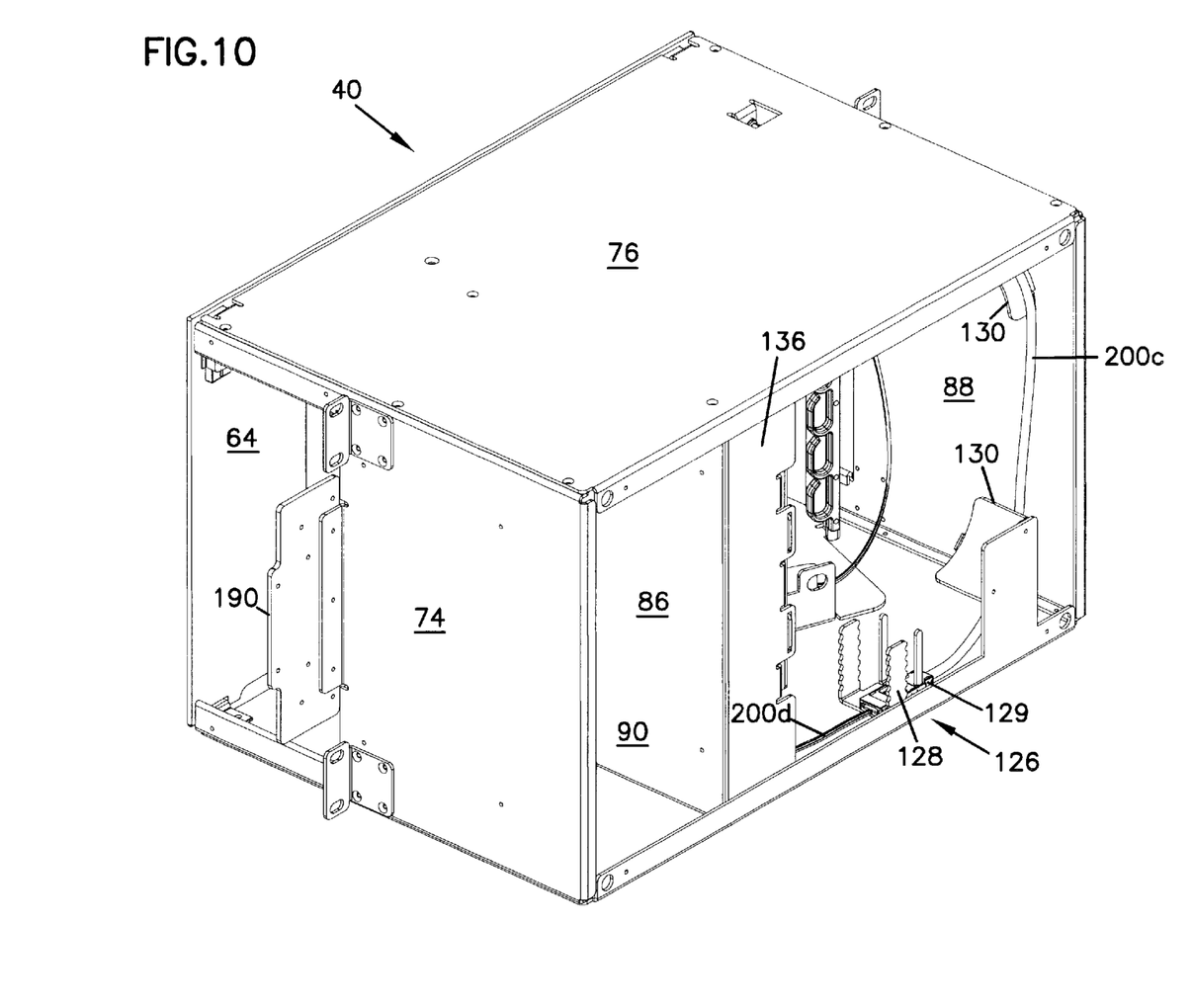
FIG. 10 is a rear, top and right side perspective of the termination module shown in FIG. 5, without the rear panel.
Figure 11:
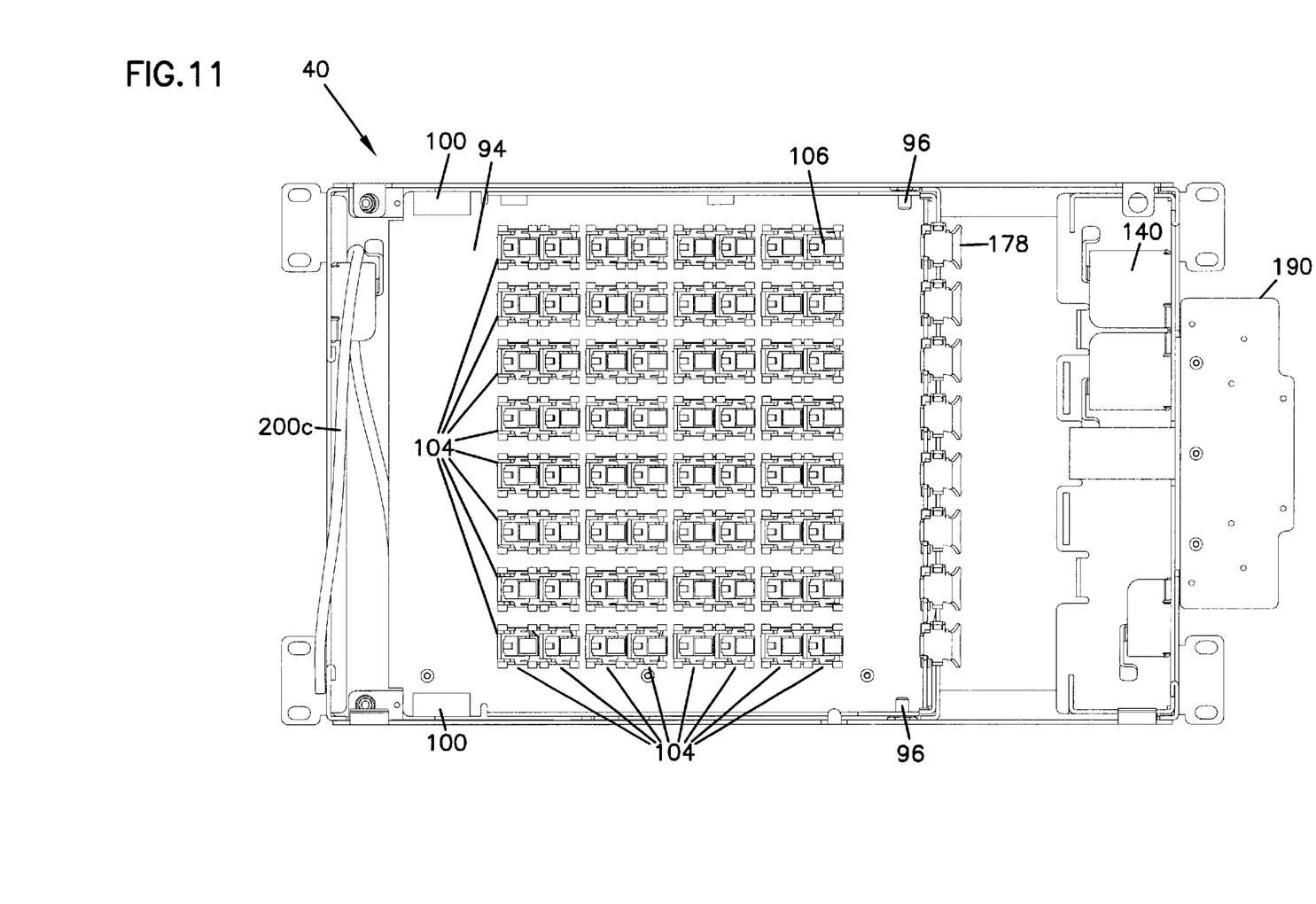
FIG. 11 is a front view of the termination module of FIG. 5, without the front cover.
Figure 12:
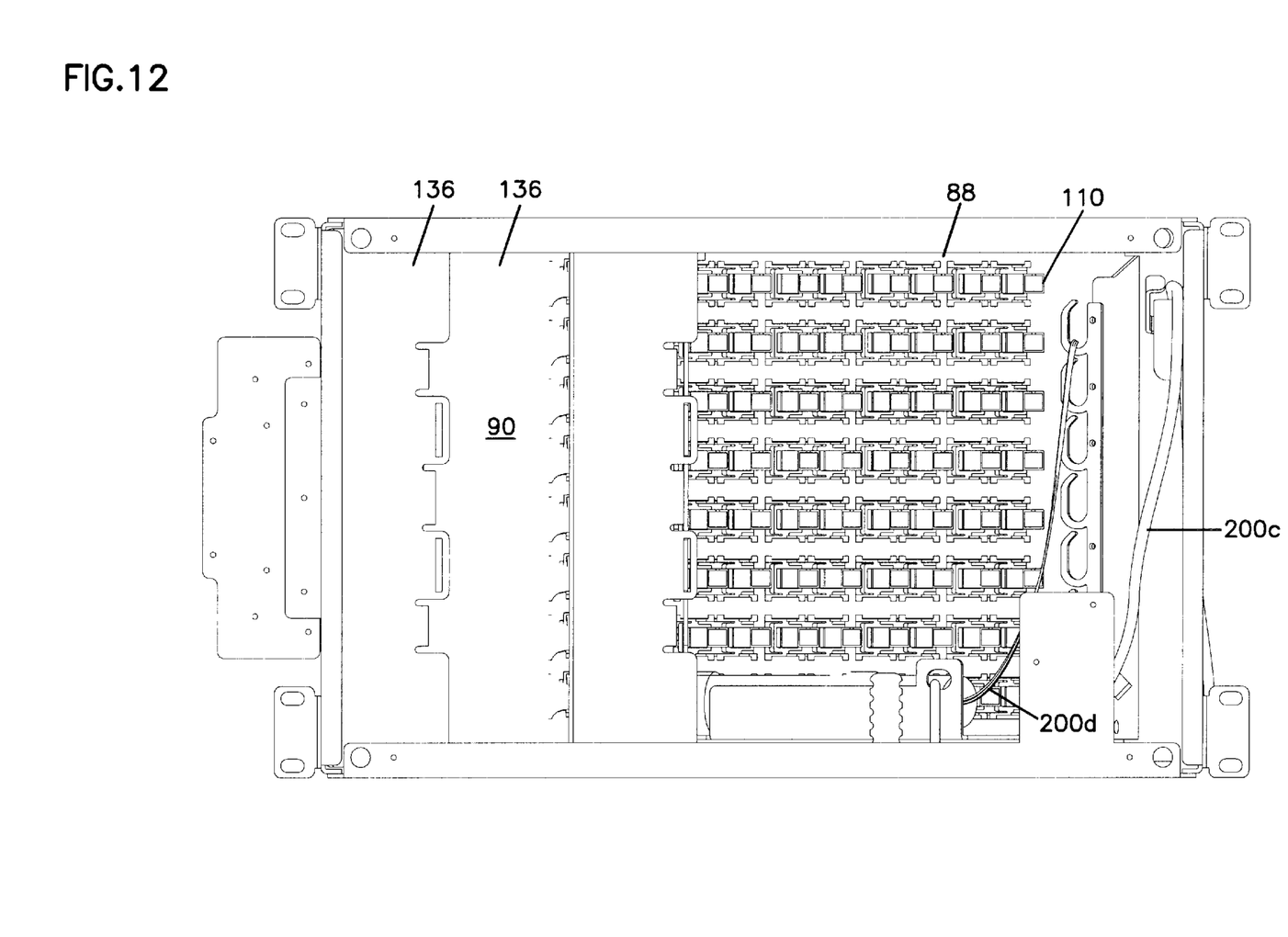
FIG. 12 is a rear view of the termination module of FIG. 5, without the rear panel.
Figure 15:
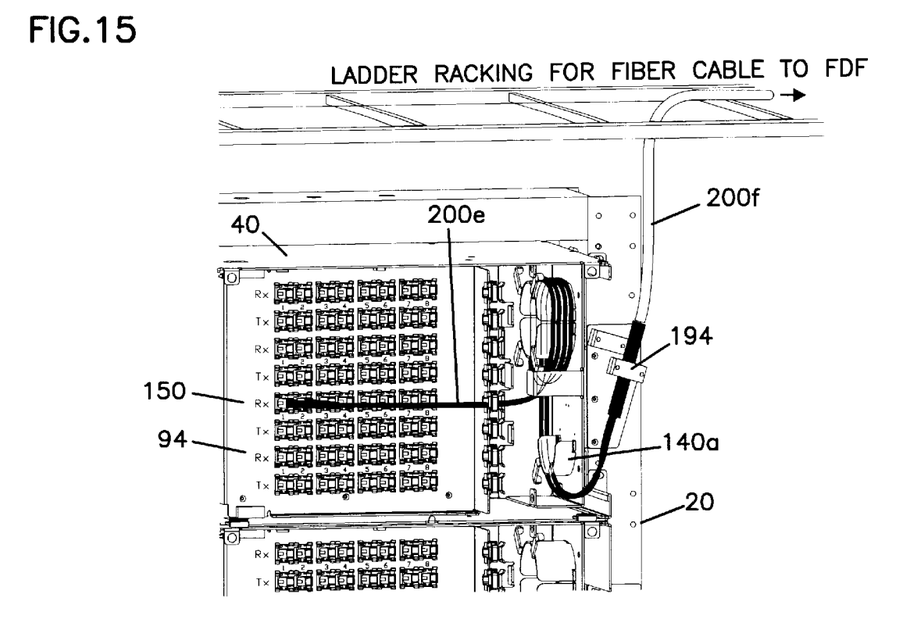
FIG. 15 shows one of the termination modules in the bay of FIG. 1 with front cabling.
Figure 16:
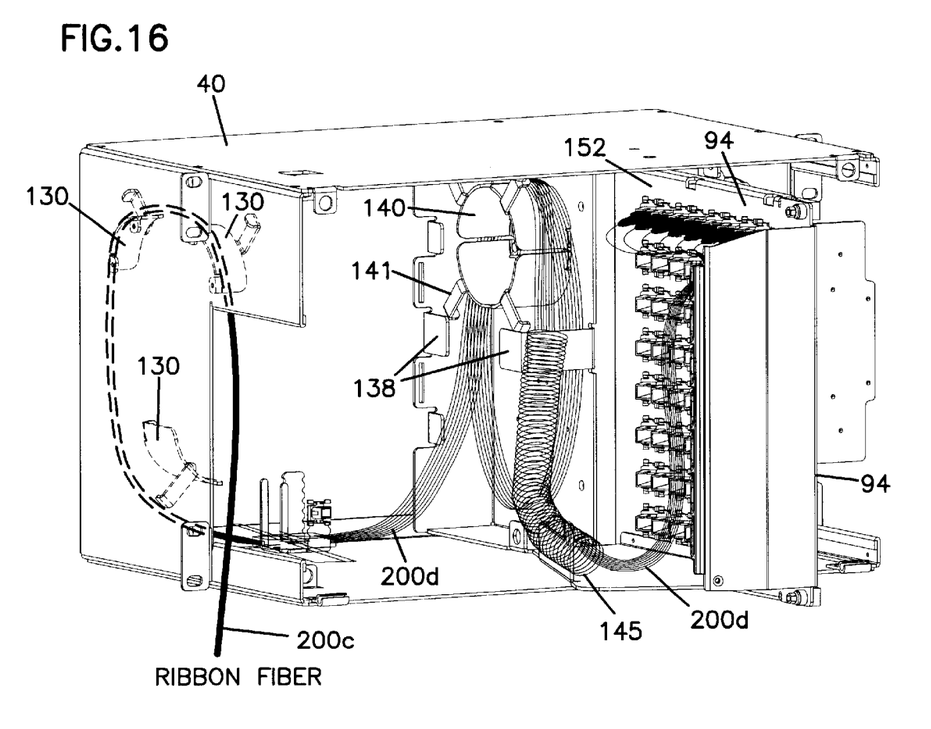
FIG. 16 shows the termination module of FIG. 15 with rear cabling.

During use, multi-fiber ribbon cables 200a (FIG. 2) extend upward from equipment bay 22 to troughing 52. From troughing 52, the multi-fiber cables extend into management panel 42 for storage of any slack loop 200b. From management panel 42, the multi-fiber cables extend into one of termination modules 40 where the cable 200c (FIGS. 10 and 16, for example) is fanned out into individual fibers or cables 200d for termination on a rear side 152 of a termination panel 94 (See FIG. 16). From a front side 150 of panel 94, individual cables 200e (FIG. 15) extend out of termination module 40 and extend to other equipment or frames as individual fibers, or as a multi-fiber cable 200f. Further details about termination module 40 and management of the cables and fan-outs will be described below.

Referring now to FIGS. 5–14, one of the termination modules 40 is shown in greater detail. Module 40 includes a housing 62 and a front cover 64 hingedly connected about hinges 66. Latches 68 releasably hold front cover 64 in the closed position.

Housing 62 includes a bottom 70, and first and second opposite sides 72, 74. A top 76 and a rear 78 are also provided. Housing 62 has generally planar sidewalls or panels, and can be made from sheet metal. Preferably, rear 78 is removable with latches 79. Brackets 80 permit module 40 to mount to bay 20 such as with fasteners.

Module 40 defines an open front 84 and a front edge 85. An internal panel 86 defines two areas or chambers 88, 90 within an interior of housing 62. Both areas 88, 90 communicate with open front 84. A hinged panel 94 is positioned to selectively open and close access to first area 88. In the preferred embodiment, panel 94 is hinged at hinge axis 95 adjacent to interior panel 86. Panel 94 presents a front face or side 150 for front cables and a rear face or side 152 for rear cables for termination at panel 94. Panel 94 is recessed from front edge 85 to allow room for the front cables.

Figure 13:
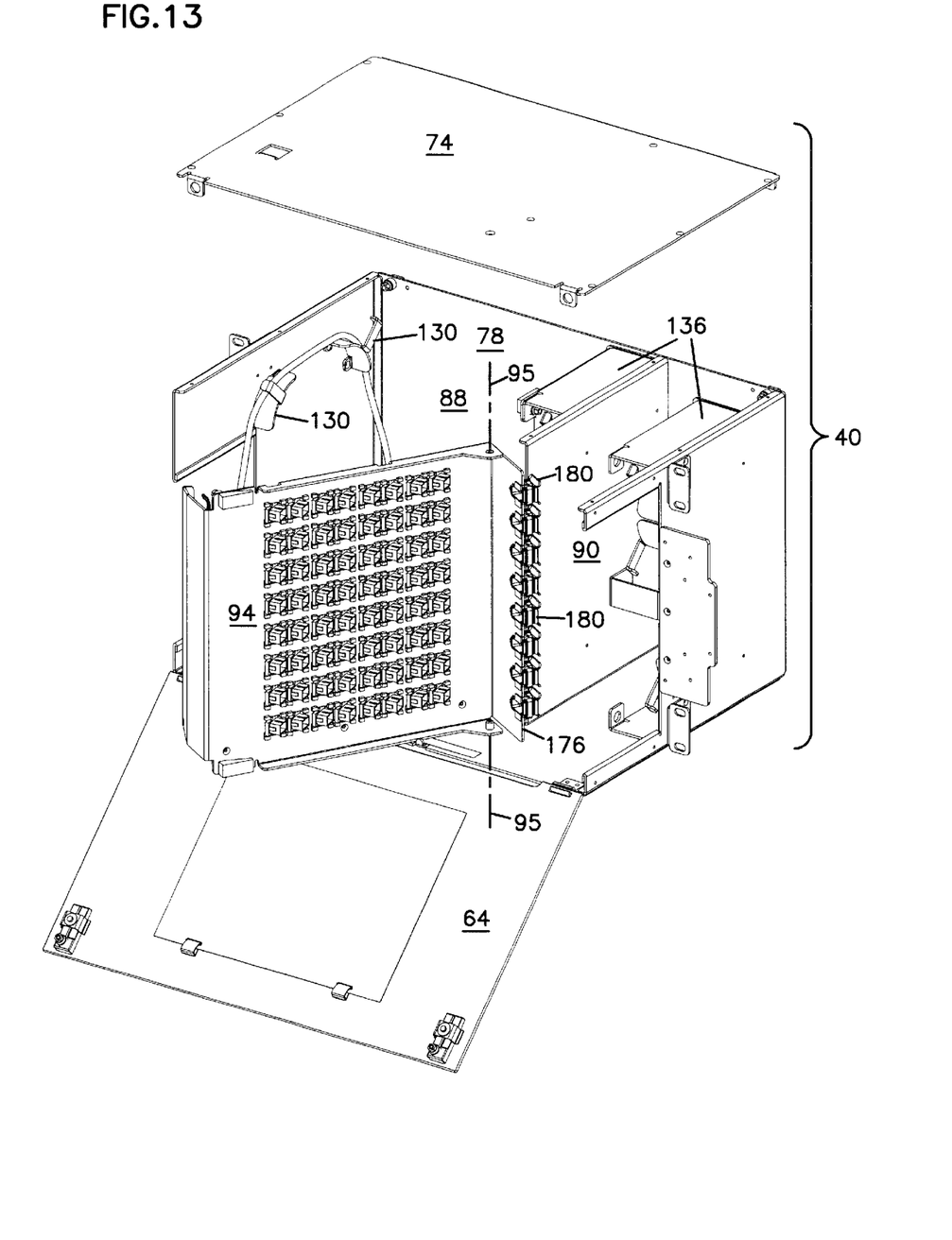
FIG. 13 is a front, top and right side perspective view of the termination module of FIG. 5, shown with the front cover pivoted open, the top exploded from the rest of the housing, and showing the front termination panel in the pivoted open position.
Figure 14:
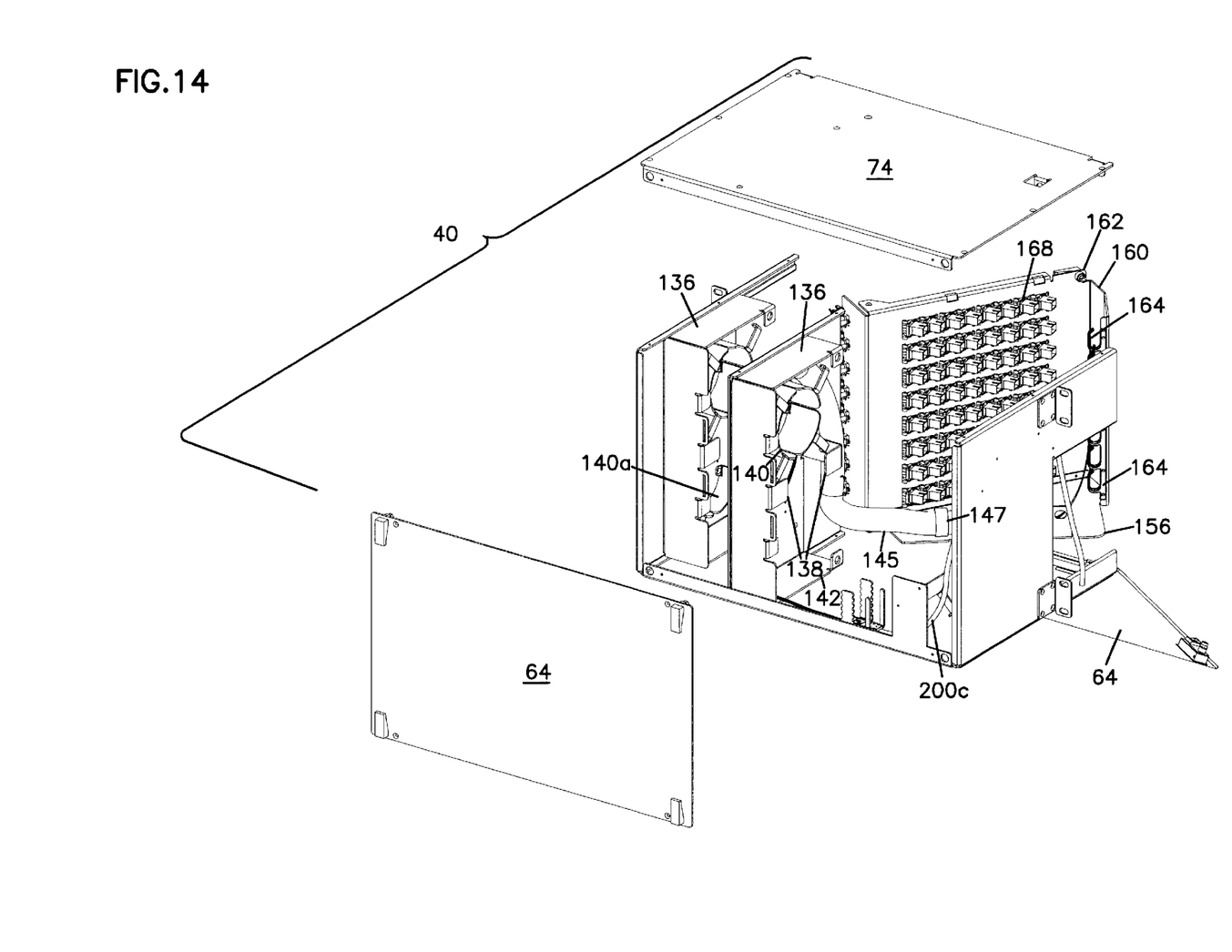
FIG. 14 is a rear, top and left side perspective view of the termination module of FIG. 13, with the rear panel exploded from the rest of the housing.

Panel 94 pivotally moves between open and closed positions about a hinge 96. When panel 94 is in the closed position, front side 150 faces toward a front of module 40. When pivoted open, a user can access rear side 152, such as to connect or disconnect rear cables. A stop 98 limits the amount of rotation of panel 94. Latches 100 hold panel 94 in the closed position.

Panel 94 defines a plurality of termination access locations 104. The termination locations include adapters 106 which each include at least two aligned openings, one on a front side 108, and the other on a rear side 110 for holding two connectors to optically connect the connectors and the cables connected to the connectors. Various adapters 106 can be utilized including an adapter of the type shown in U.S. Pat. No. 5,317,663, constructed so as to have the commonly known SC configuration for receiving an SC connector on each end. Other adapter/connector styles can be utilized including ST, FC, and small form factor adapters/connectors such as shown in U.S. Pat. No. 6,142,676. The disclosures of both U.S. Pat. Nos. 5,317,663 and 6,142,676 are incorporated by reference.

Module 40 includes a first access opening 120 wherein cables entering module 40 at first access opening 120 are positioned in first area 88 and can be terminated at rear side 110 of each of the adapters 106 at rear side 1.52 of panel 94.

From the front side 108 of each adapter 106, cables can then pass into second area 90 and out module 40 at second access opening 124.

Cables entering module 40 at first access opening 120 can be multi-fiber cables which fan out at cable fan-out locations 126. Cable fan-out locations 126 include cable fan-out ties 128 for holding fan-outs 129. First area 88 also includes cable guides 130 for directing cables from first access opening 120 to cable fan-out locations 126.

To further manage the cables in first area 88, a cable box 136 is provided with various structures for storing slack lengths of cables. Cable box 136 includes tabs 138, and a spool 140. Spool 140 has fingers 141 for cable retention. Tabs 138 extend from a wall 142 of box 136. In the case of multi-fiber cables, cable box 136 takes up any slack in the individual fibers. Such a structure allows a multi-fiber cable to be connectorized with individual connectors at common lengths. However, such common lengths will result in different slack lengths from the fan out locations to the terminations at the adapters with respect to each multi-fiber cable. The different slack lengths are taken up by spool 140 and maintained in an organized and protected manner inbox 136.

The front side 150 and the rear side 152 of panel 94 can be made from planar structures, such as sheet metal. A rear tray 156 for supporting the cables is provided. A tubing 145 held by a clamp 147 on rear tray 156 can be used for protecting the cables. A rear flange 160 extends rearwardly adjacent a free end 162 of panel 94. A plurality of cable clips 164 are provided on the rear flange 160 for holding cables and defining a vertical array. A plurality of openings 168 are provided through panel 94 for receiving the adapters 106. Angling of the cables is facilitated by the use of angled retainers 172. Each angled retainer 172 holds each adapter 106 so its longitudinal axis is at a non-transverse angle to the panel 94. U.S. Pat. No. 5,214,735 shows example retainers usable with panel 94. The disclosure of U.S. Pat. No. 5,214,735 is incorporated by reference.

Extending along a front of panel 94 is a front flange 176 including a plurality of edge protectors 178, including cable retention clips 180 defining a vertical array. Positioned in second area 90 of module 40 is a cable box 136 for storing cables extending from front side 150 of panel 94 before exiting module 40 at second access opening 124. In the case of multi-fiber cables entering at side access location 124, cable box 136 takes up any slack in the individual fibers. Such a structure allows a multi-fiber cable to be connectorized with individual connectors at common lengths. However, as above for the rear cables, such common lengths on the front cables will result in different slack lengths from the fan out locations to the terminations at the adapters with respect to each multi-fiber cable. The different slack lengths are taken up by spool 140 and maintained in an organized and protected manner. A further half spool 140a can also be used, or other structures as desired.

Side flange 190 holds cable clamps 192 for fanning out multi-fiber cables. Modules 40 can be provided with a bend limiter 198 to help protect individual fibers extending from module 40, but not transitioning to multi-fiber cables.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A fiber breakout bay comprising:
   (a) a rack extending vertically from a bottom to a top, the rack defining a left side, a right side, a front, and a rear;
   (b) a left vertical cable guide with a side access, located on the left side of the rack;
   (c) a right vertical cable guide with a side access, located on the right side of the rack;
   (d) a plurality of cable termination modules on the rack, each module including:
      a housing defining first and second side access locations on opposite sides of the housing, the housing defining an interior, the housing including a divider dividing the interior into first and second areas, the first area communicating with the first side access location, the second area communicating with the second side access location;
      a pivoting panel positioned for selective movement between open and closed positions adjacent to the first area, the pivoting panel closing the first area, the pivoting panel defining termination access locations;
      the first area including a first cable spool disposed in the interior of the housing;
      the second area including a second cable spool disposed in the interior of the housing.

2. The bay of claim 1, wherein the pivoting panel is recessed from a front edge of the housing when the panel is in the closed position, and further comprising a cover mounted to the front edge of the housing.

3. The bay of claim 1, wherein the pivoting panel includes a vertical array of cable clips positioned on a front side of the panel for movement with the panel.

4. The bay of claim 1, wherein the pivoting panel includes a vertical array of cable clips positioned on a rear side of the panel for movement with the panel.

5. The bay of claim 4, wherein the pivoting panel includes a vertical array of cable clips positioned on a front side of the panel for movement with the panel.

6. The bay of claim 1, further comprising a plurality of adapters positioned at the termination access locations, each adapter mounted to the pivoting panel.

7. The bay of claim 6, further comprising an angled retainer mounting the adapters to the pivoting panel.

8. The bay of claim 1, further comprising a cable fan-out mounting location positioned in the first area.

9. The bay of claim 1, further comprising a cable fan-out mounting location positioned adjacent to the second side access location.

10. A fiber breakout and equipment bay comprising:

(a) a first rack extending vertically from a bottom to a top, the rack defining a left side, a right side, a front, and a rear;

(b) a first vertical cable guide with a side access, the first vertical cable guide positioned on the left or the right side of the rack, and a second vertical cable guide with a side access, the second vertical cable guide positioned on the other of the left and right side of the rack;

(c) a plurality of cable termination modules on the rack, each module including:

a housing defining first and second cable access locations, the housing defining an interior including first and second areas, the first area communicating with the first cable access location, the second area communicating with the second cable access location, the first cable access location communicating with the first vertical cable guide;

a pivoting panel positioned for selective movement between open and closed positions adjacent to the first area, the pivoting panel defining termination access locations;

the first area including a first cable spool disposed in the interior of the housing;

the second area including a second cable spool disposed in the interior of the housing;

(d) a cable slack storage area positioned on the rack, the cable slack storage area defining a plurality of spools;

(e) a first cable passageway from the cable slack storage area to the first vertical cable guide;

(f) a second rack adjacent to the first rack for holding equipment;

(g) a second cable passageway extending between the second rack and the cable slack storage area;

(h) the second cable access locations communicating with the second vertical cable guide.

11. The bay of claim 10, wherein the pivoting panel includes a first vertical array of clips mounted on a rear of the panel for rotational movement with the panel, and wherein the panel includes a second vertical array of clips mounted on a front of the panel for rotational movement with the panel.

12. The bay of claim 10, wherein the pivoting panel includes a rear horizontal tray.

13. The bay of claim 10, wherein the pivoting panel includes a latch for latching the panel in a closed position.

14. The bay of claim 10, further comprising a plurality of adapters, each adapter mounted to the pivoting panel.

15. The bay of claim 15, further comprising an angled retainer mounting the adapters to the pivoting panel.

16. A fiber optic termination module comprising:

a housing defining first and second side access locations on opposite sides of the housing, the housing defining an interior, the housing including a divider dividing the interior into first and second areas, the first area communicating with the first side access location, the second area communicating with the second side access location;

a pivoting panel positioned for selective movement between open and closed positions adjacent to the first area, the pivoting panel closing the first area, the pivoting panel defining termination access locations;

the first area including a first cable spool disposed in the interior of the housing;

the second area including a second cable spool disposed in the interior of the housing.

17. The module of claim 16, wherein the pivoting panel is recessed from a front edge of the housing when the panel is in the closed position, and further comprising a cover mounted to the front edge of the housing.

18. The module of claim 16, wherein the pivoting panel includes a vertical array of cable clips positioned on a front side of the panel for movement with the panel.

19. The module of claim 16, wherein the pivoting panel includes a vertical array of cable clips positioned on a rear side of the panel for movement with the panel.

20. The module of claim 19, wherein the pivoting panel includes a vertical array of cable clips positioned on a front side of the panel for movement with the panel.

21. The module of claim 16, further comprising a plurality of adapters positioned at the termination access locations, each adapter mounted to the pivoting panel.

22. The module of claim 21, further comprising an angled retainer mounting the adapters to the pivoting panel.

23. The module of claim 16, further comprising a cable fan-out mounting location positioned in the first area.

24. The module of claim 16, further comprising a cable fan-out mounting location positioned adjacent to the second side access location.

* * * * *